(12) United States Patent
Mukai et al.

(10) Patent No.: US 6,682,450 B2  
(45) Date of Patent: Jan. 27, 2004

(54) V-BELT-TYPE AUTOMATIC TRANSMISSION FOR VEHICLE

(75) Inventors: Yasuaki Mukai, Saitama (JP); Hirokazu Komura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 105 days.

(21) Appl. No.: 09/799,604

(22) Filed: Mar. 7, 2001

(65) Prior Publication Data

US 2001/0039222 A1 Nov. 8, 2001

(30) Foreign Application Priority Data

Mar. 7, 2000 (JP) ........................................ 2000-062540

(51) Int. Cl.[7] ................................................. F16H 9/12
(52) U.S. Cl. ............................. 474/15; 474/12; 474/17
(58) Field of Search ............................ 474/8, 11, 12, 474/13, 14, 15, 17

(56) References Cited

U.S. PATENT DOCUMENTS

| | | | | |
|---|---|---|---|---|
| 3,824,867 A | * | 7/1974 | Brooks ................ 74/230.17 E |
| 3,975,964 A | * | 8/1976 | Adams ................ 74/230.17 A |
| 4,432,743 A | * | 2/1984 | Pitoiset ........................ 474/14 |
| 4,925,432 A | * | 5/1990 | Miyamaru et al. .............. 474/8 |
| 5,154,673 A | * | 10/1992 | Fukunaga et al. ............. 474/13 |
| 5,188,568 A | * | 2/1993 | Gourdon ....................... 474/13 |
| 5,529,544 A | * | 6/1996 | Berto ........................... 474/11 |

FOREIGN PATENT DOCUMENTS

JP    A59113353    6/1984

* cited by examiner

*Primary Examiner*—Jack Lavinder  
*Assistant Examiner*—Bradley King  
(74) *Attorney, Agent, or Firm*—Birch, Stewart, Kolasch & Birch, LLP

(57) ABSTRACT

A V-belt-type automatic transmission for a vehicle is provided with a drive pulley and a driven pulley, wherein a plurality of centrifugal weights are arranged between a movable pulley piece of the drive pulley and a cam plate. The centrifugal weights are moved in a radial direction by centrifugal force. A wrapping radius of a V-belt wound around the drive pulley and the driven pulley is changed depending on a maximum gear ratio in a low-speed rotation range and a minimum gear ratio in a high-speed rotation range that are set. The movement in a radial direction of the centrifugal weight beyond a predetermined radial distance prevented by a stopper surface at the rotational speed in a middle-speed rotation range, and at least one middle gear ratio is thereby set. This arrangement provides a V-belt automatic transmission providing noise reduction, reduction of machinery wear and facilitates smooth power transmission.

17 Claims, 8 Drawing Sheets

V-BELT-TYPE AUTOMATIC TRANSMISSION FOR VEHICLE

BACKGROUND OF THE INVENTION

1. Field of the Invention

The present invention relates to a V-belt-type automatic transmission for a vehicle, and more particularly to a V-belt-type automatic transmission including centrifugal weights mounted on a vehicle such as a motorcycle.

2. Background Art

In the related art, a V-belt-type automatic transmission mounted on a motorcycle includes a V-belt wound around and extending between a drive pulley provided at the end of a crankshaft of an internal combustion engine and a driven pulley provided on a driven shaft linked to a rear axle by a final reduction gear.

When the rotational speed of the internal combustion engine increases with respect to the drive pulley, a movable pulley pressed by a weight roller moving radially outward under centrifugal force approaches a fixed pulley piece. Concurrently, a movable pulley piece urged by a spring moves away from the fixed pulley piece with respect to the driven pulley and against the spring force. Therefore, a wrapping radius of the V-belt of the drive pulley and driven pulley is automatically changed, and the gear ratio decreases.

A V-belt-type automatic transmission is shown, for example, in Japanese Patent Laid-open Publication No. Sho. 59-113353. A middle gear ratio is obtained having a value between two gear ratios. The middle gear ratio is set in a middle speed range between a low-speed rotation range where the gear ratio is set at maximum gear ratio, and a high-speed rotation range where the gear ratio is set at minimum gear ratio.

In a fourth embodiment of the transmission apparatus disclosed in the Japanese Patent Laid-open Publication, a pair of sloped surfaces on which a weight rolls are provided on a rear surface of a right pulley element of a drive pulley. The stopper surface of one of the pair of sloped surfaces is arranged more radially inward than the stopper surface of other sloped surface, and the weight comes into contact with the stopper surface of the other sloped surface in the middle-speed rotation range. Therefore, radial movement is prevented and the middle gear ratio is set.

Generally, in a driven pulley of a V-belt-type automatic transmission, a movable pulley piece is urged towards a fixed pulley piece by the spring force of a cylindrically-shaped an compressed coil spring. The moveable pulley piece moves in an axial direction against or urged by the spring force in the event of change in the wrapping radius of the V-belt. A spring guide is also provided inside the spring for preventing the spring from collapsing or bending.

The right pulley element of the transmission disclosed in the Japanese Patent Laid-open Publication moves further in the axial direction by the weight rolling on the other sloped surface in the high-speed rotation range. A gap in the axial direction is arranged between the weight coming into contact with the stopper surface of the other sloped surface and the right pulley element. The gap prevents weight from moving in the radial direction.

As a result, due to engine vibrations, etc., there is relative movement in the axial direction between the right pulley element and the weight. There is additional movement between a cover sandwiching the right pulley element and the weight. The weigh can collide with adjacent parts causing abrasion. In addition, the weight is prevented from moving smoothly in the radial direction, therefore possibly causing difficulty in smooth transmission.

As a result of friction with a spring guide partly coming into contact with the internal circumference of the spring when the spring is expanded or contacted, or as a result lack of smooth spring contraction due to contact of the spring against a tip of the spring guide during spring contraction, the movable pulley piece may be prevented from moving smoothly with respect to the driven pulley and transmission may not be executed smoothly.

SUMMARY OF THE INVENTION

The present invention overcomes the shortcomings associated with the related art and achieves other advantages not realized by the related art. An object of the present invention is to provide a V-belt-type automatic transmission for vehicles that is capable of smooth transmission between gear ratios and operating speeds.

These and other objects are accomplished by A V-belt automatic transmission for a vehicle comprising a drive pulley provided on a driveshaft, the drive pulley further including a drive side moveable pulley piece, a drive side fixed pulley piece, a cam plate, a plurality of centrifugal weights arranged between the drive side movable pulley piece and the cam plate, the drive side movable pulley piece moveable in an axial direction of the driveshaft and rotateable with the cam plate on the driveshaft, and a plurality of pulley side guide surfaces for guiding the plurality of centrifugal weights formed extending in a radial direction of the driveshaft on a rear surface of the drive side movable pulley, the plurality of centrifugal weights including a first set of centrifugal weights and a second set of centrifugal weights, each centrifugal weight of the first set is lighter than each centrifugal weight of the second set; a driven pully provided on a driven shaft; a V-belt having a wrapping radius and wrapped around the drive pulley and the driven pulley for transmitting torque from the drive shaft to the driven shaft, wherein the wrapping radius is changed based on a movement in a radial direction along each pulley side guide surface of the plurality of centrifugal weights arranged between a pulley side guide surface provided on the drive side movable pulley piece and a cam side guide surface provided on the cam plate; and a maximum gear ratio in a low-speed rotation range and a minimum gear ratio in a high-speed rotation range set when the plurality of centrifugal weights are prevented from moving in a radial direction at a speed faster than a prescribed rotational speed in at least one middle-speed rotation range to thereby set and define a middle gear ratio in each middle-speed rotation range.

These and other objects are further accomplished by a V-belt automatic transmission for a vehicle comprising a drive pulley provided on a driveshaft, the drive pulley further including a drive side moveable pulley piece, a drive side fixed pulley piece, a cam plate, a plurality of centrifugal weights arranged between the drive side movable pulley piece and the cam plate, the drive side movable pulley piece moveable in an axial direction of the driveshaft and rotateable with the cam plate on the driveshaft, and a plurality of pulley side guide surfaces for guiding the plurality of centrifugal weights formed extending in a radial direction of the driveshaft on a rear surface of the drive side movable pulley, the plurality of centrifugal weights including a first set of centrifugal weights and a second set of centrifugal weights, each centrifugal weight of the first set is lighter than each centrifugal weight of the second set; a driven pulley provided on a driven shaft; a V-belt having a wrapping radius and wrapped around the drive pulley and the driven pulley for transmitting torque from the drive shaft to the driven shaft, wherein the wrapping radius is changed based on a combination of a first movement in a radial direction along each pulley side guide surface of the plurality of centrifugal weights arranged between a pulley side guide surface provided on the drive side movable pulley piece and a cam side guide surface provided on the cam plate and second movement of the drive side movable pulley piece against a spring force created in response to the movable pulley piece being moved by centrifugal force of the centrifugal weights; and a maximum gear ratio in a low-speed rotation range and a minimum gear ratio in a high-speed rotation range set when the plurality of centrifugal weights are prevented from moving in a radial direction at a speed faster than a prescribed rotational speed in at least one middle-speed rotation range to thereby set and define a middle gear ratio in each middle-speed rotation range.

According to the present invention, excessive vibration and collisions between moving parts is reduced. In addition, noise occurring from normally occurring vibrations is transmitted throughout the transmission of the present invention in a manner that further suppresses noise. Since vibration is reduced, premature wear of adjacent parts in contact with another is further reduced, thereby extending operating life of all transmission components. Finally, smooth, regular transmission through a series of gear ratios and engine rotational speeds is achieved with all of the benefits of noise reduction and wear reduction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
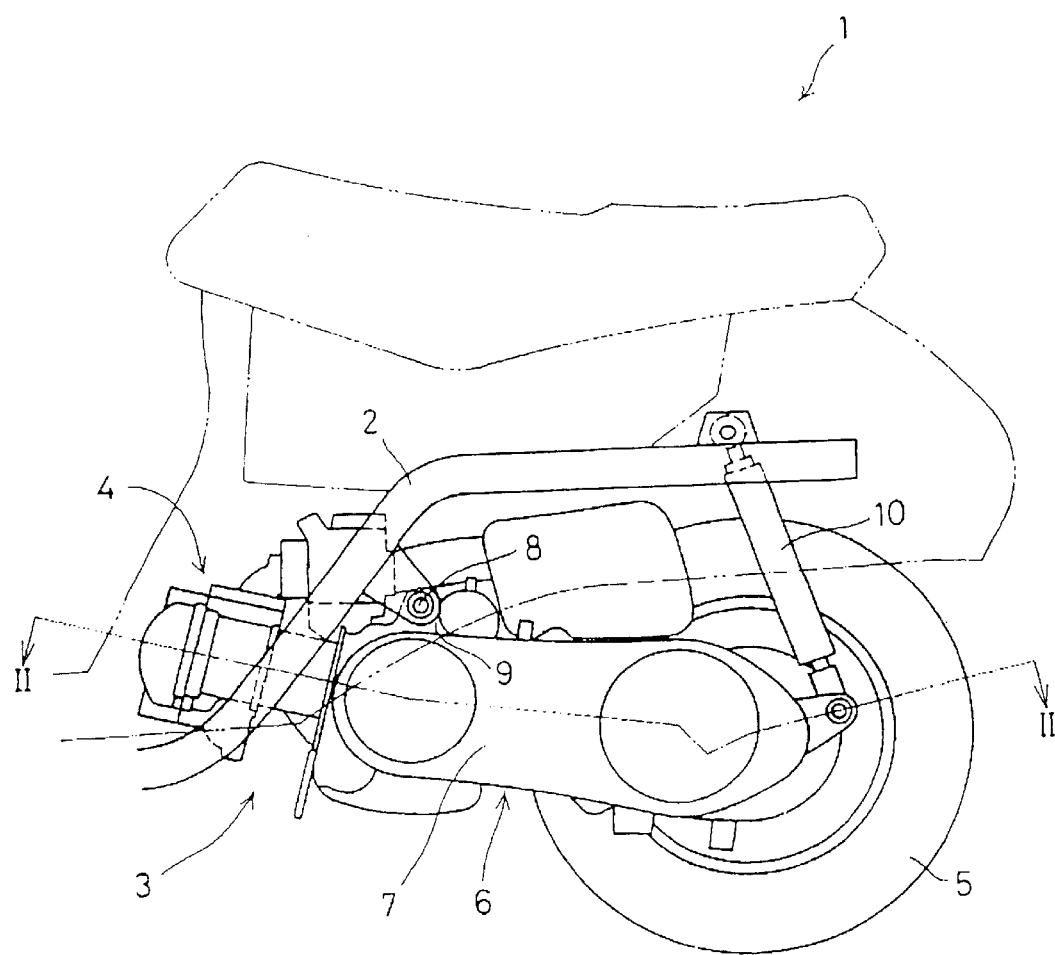
FIG. 1 is a left side elevational view of a rear portion of a motorcycle mounted with a V-belt-type automatic transmission according to an embodiment of the present invention.
Figure 2:
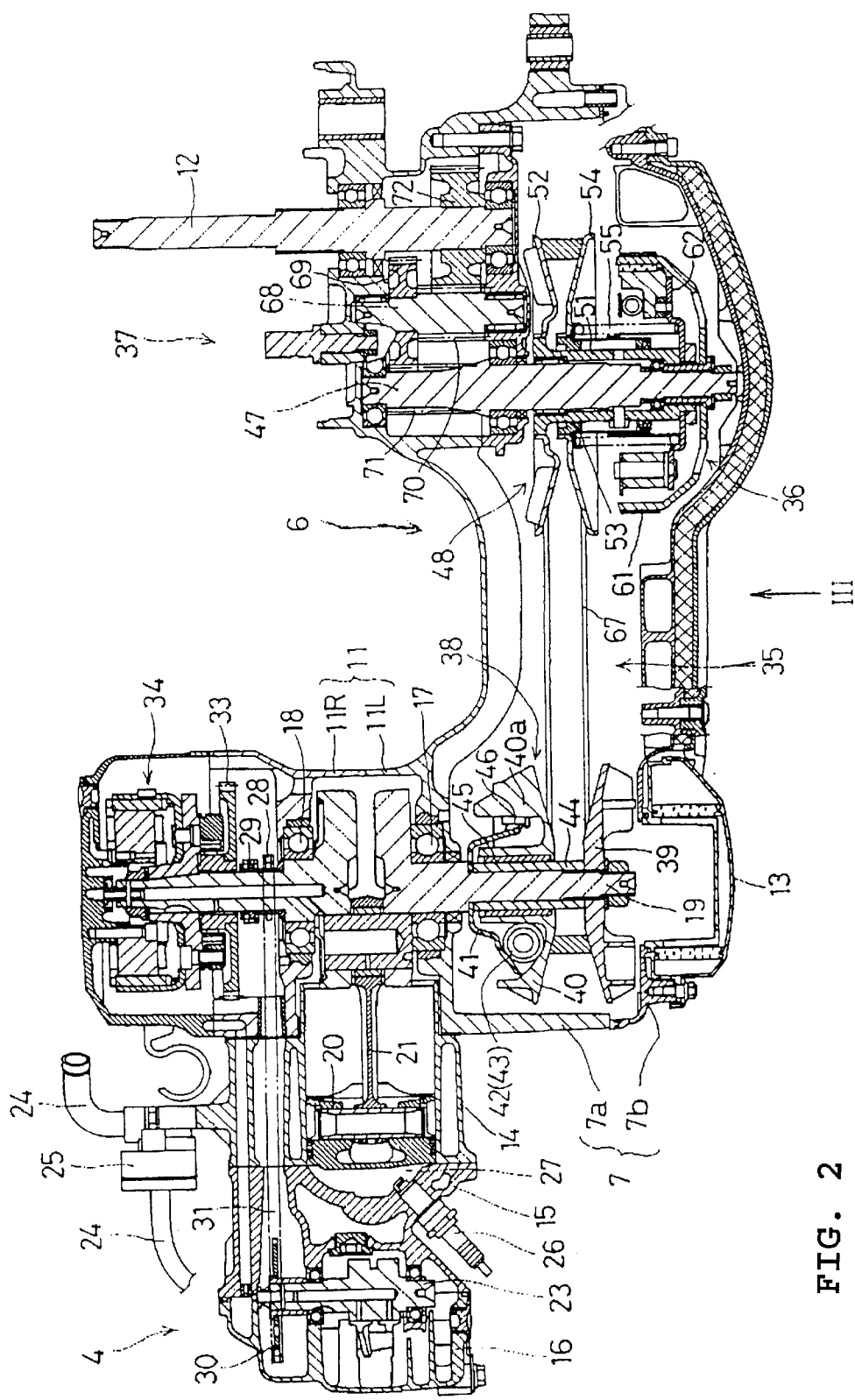
FIG. 2 is a cross sectional view taken along line II—II in FIG. 1.
Figure 3:
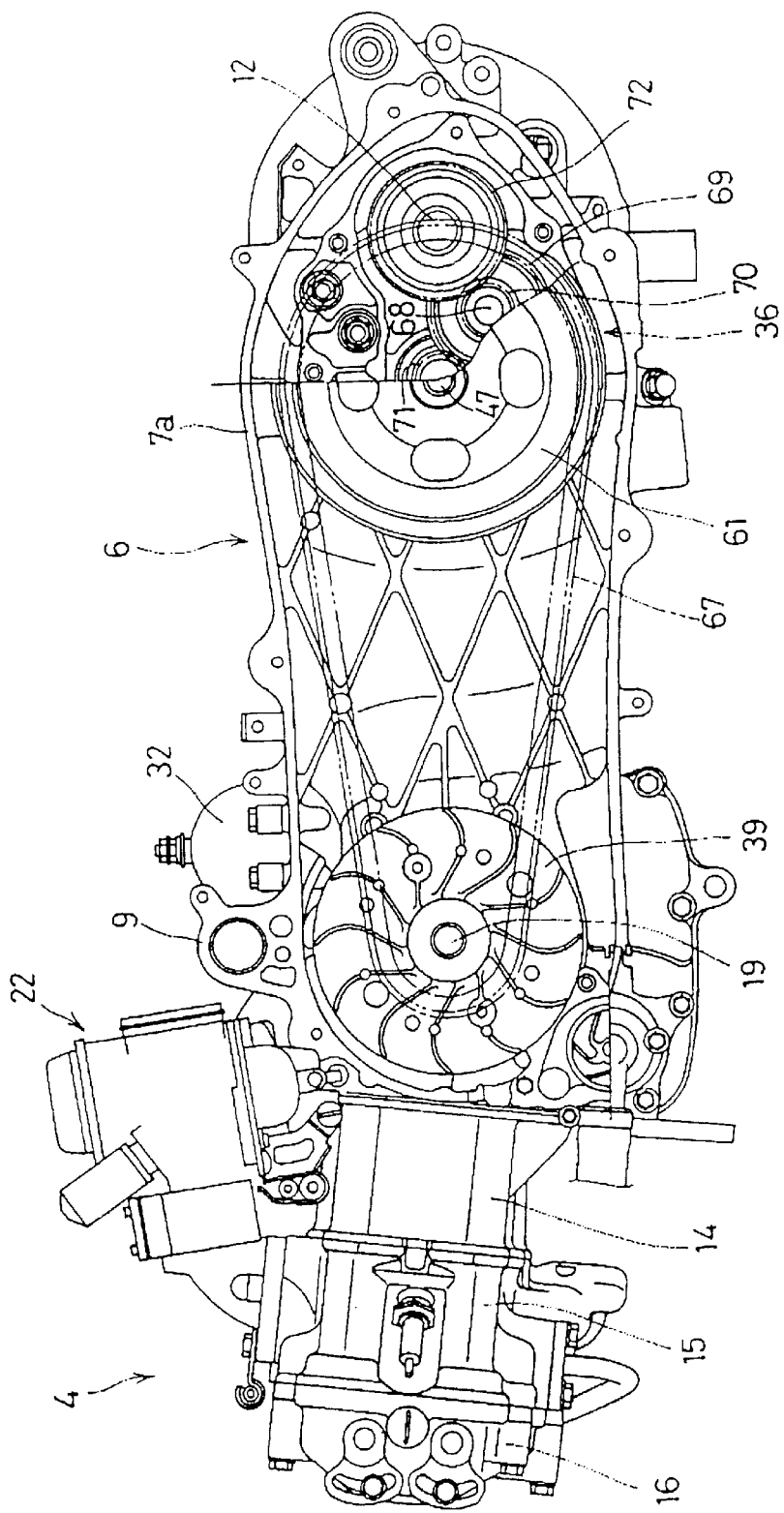
FIG. 3 is a cross sectional view taken along arrows III in FIG. 2 with a cover of a transmission case removed according to an embodiment of the present invention.
Figure 4:
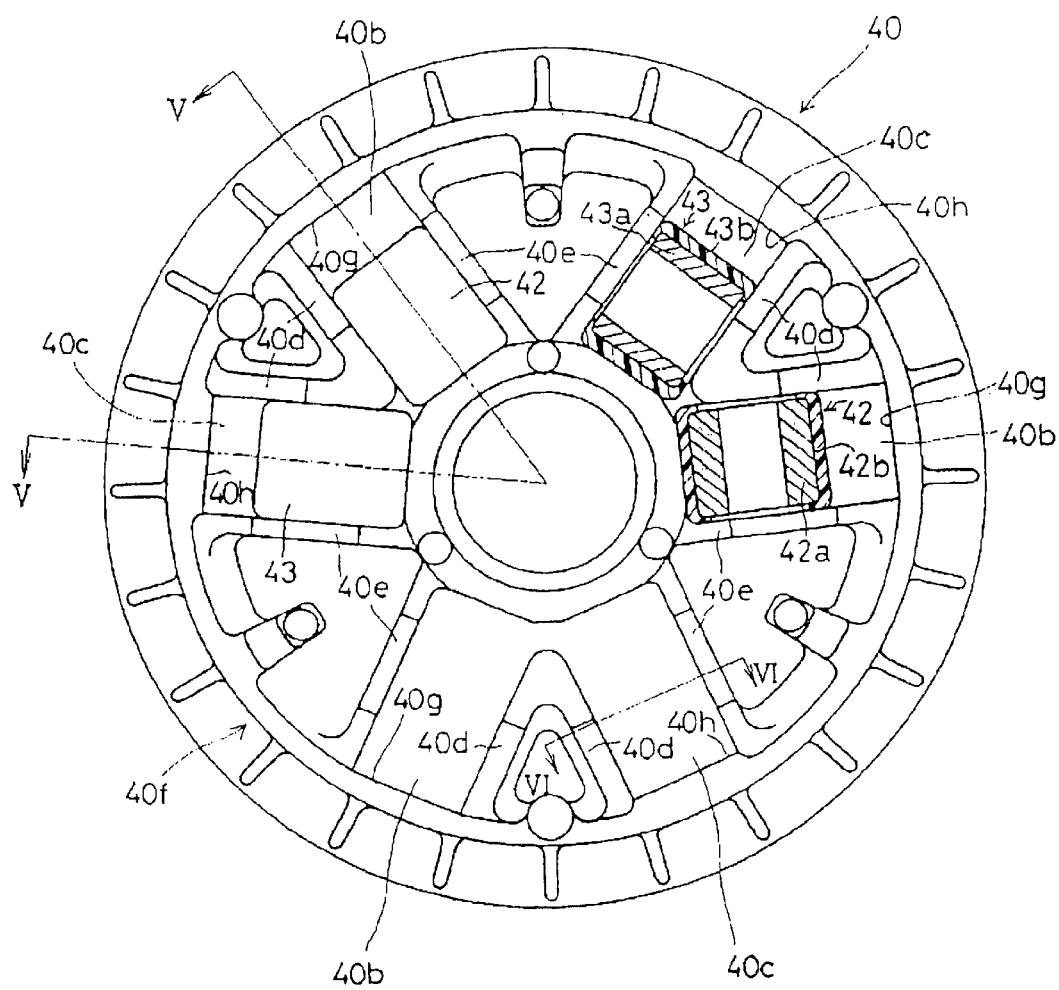
FIG. 4 is rear side view of a drive side moveable pulley piece according to an embodiment of the present invention.
Figure 5:
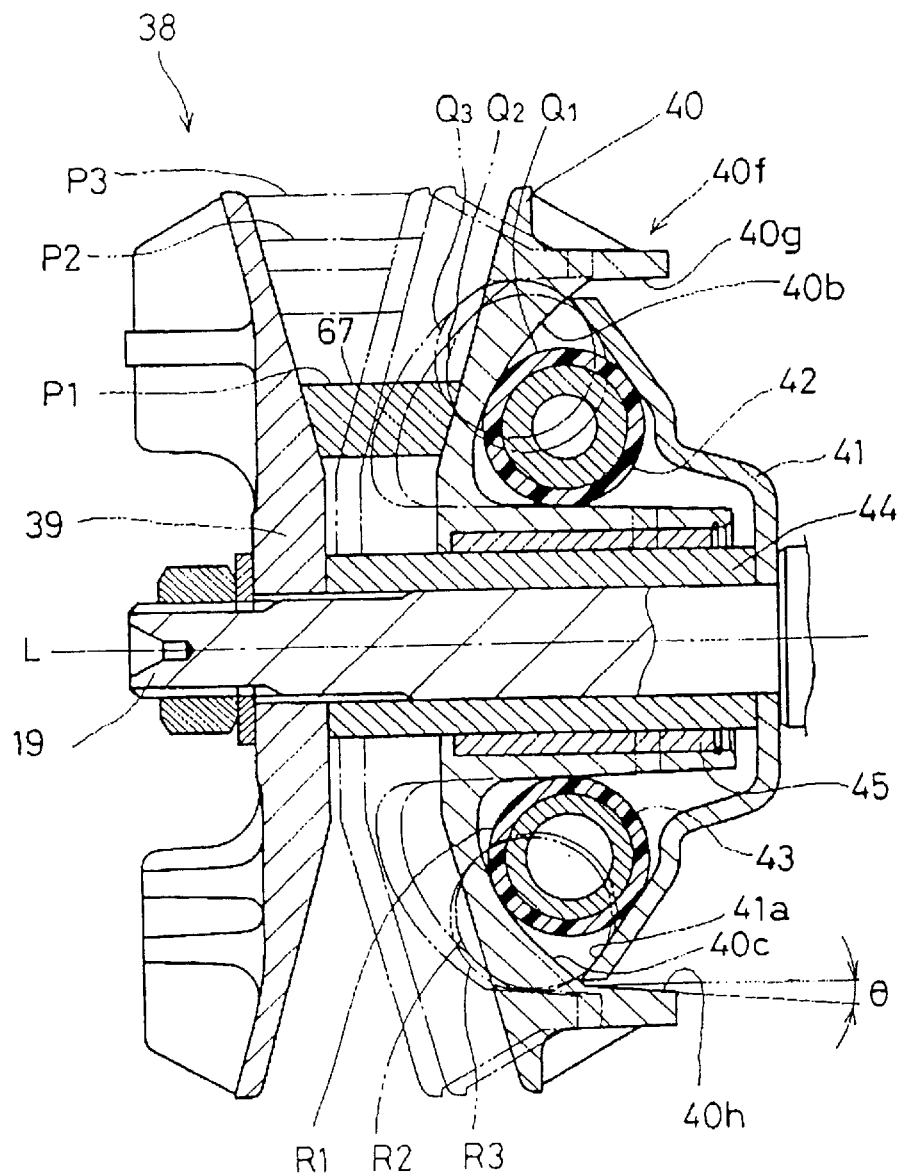
FIG. 5 is a cross sectional view taken along line V—V in FIG. 4.
Figure 6:
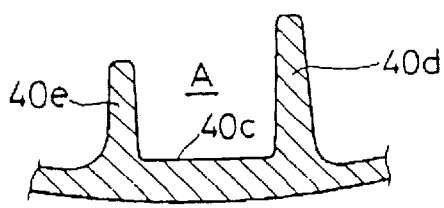
FIG. 6 is a cross sectional view taken along line VI—VI in FIG. 4.
Figure 7:
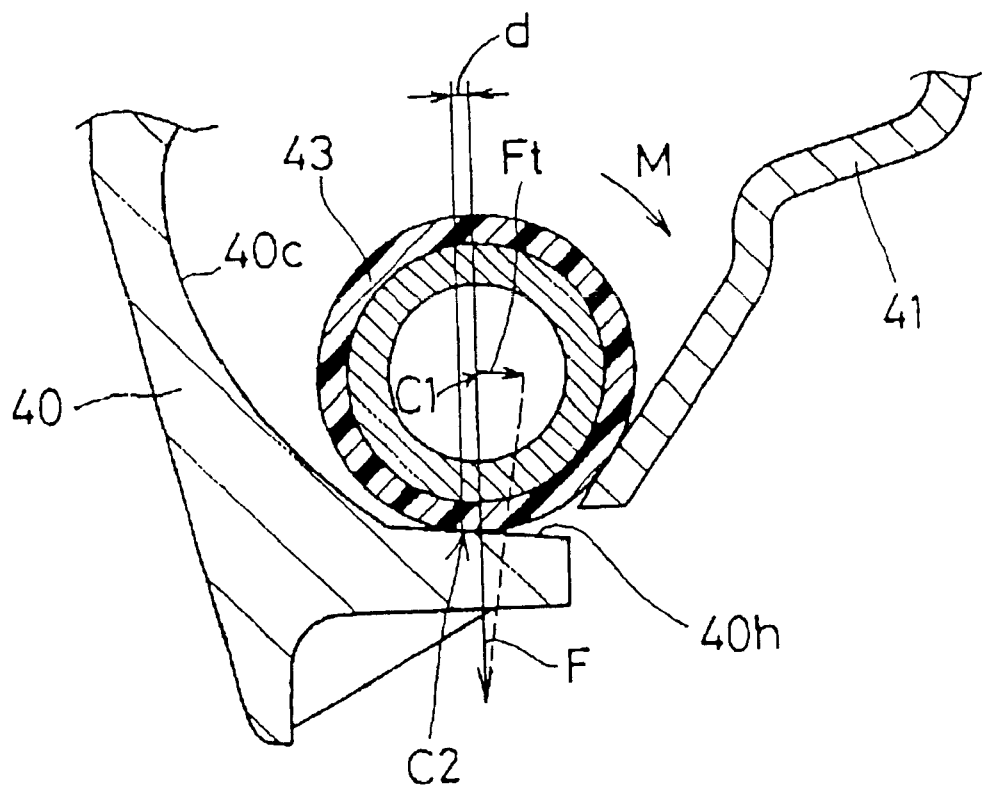
FIG. 7 is an enlarged cross sectional view of a portion of FIG. 5.
Figure 8:
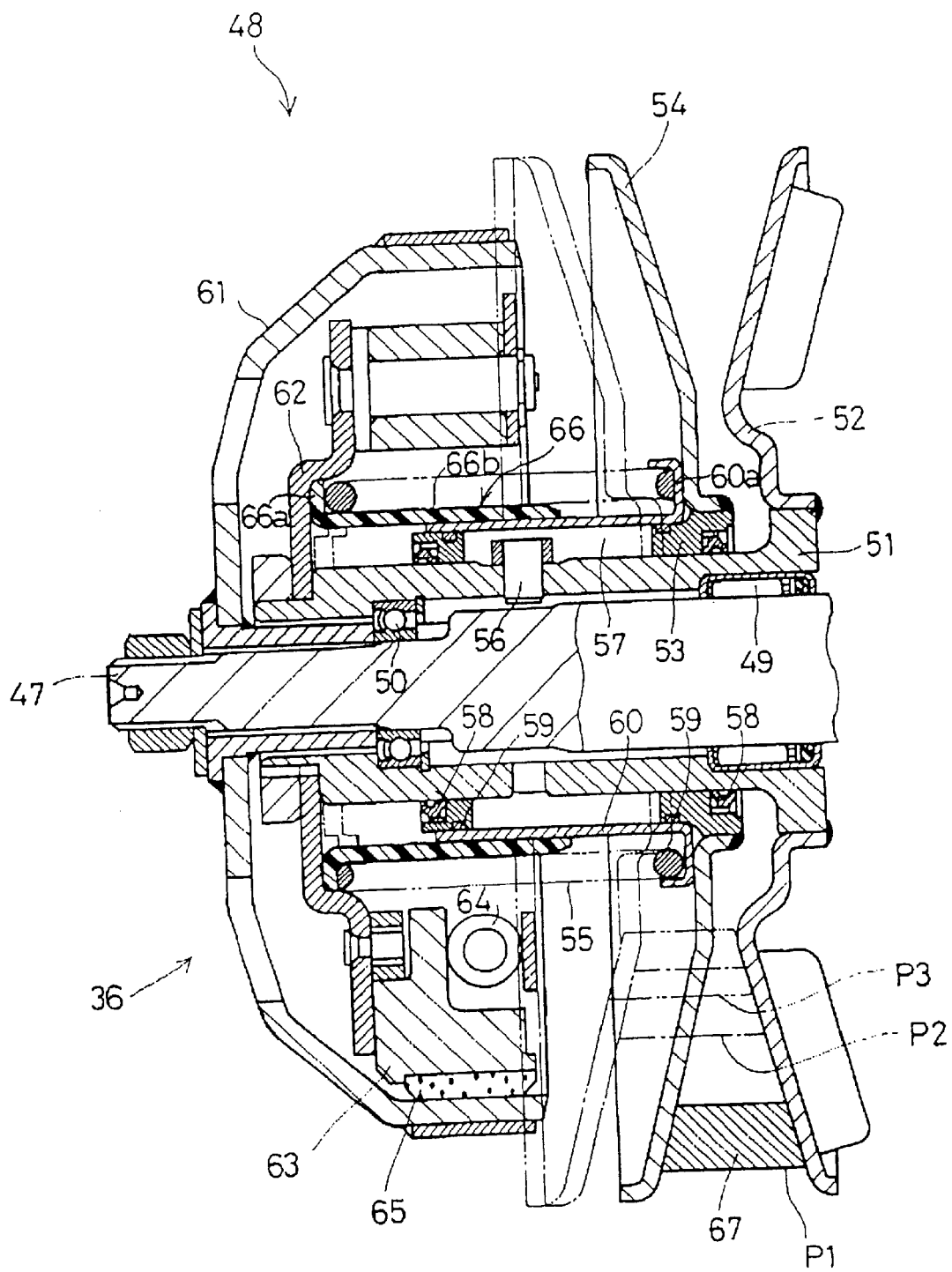
FIG. 8 is an enlarged cross sectional view of a driven pulley according to an embodiment of the present invention.
Figure 9:
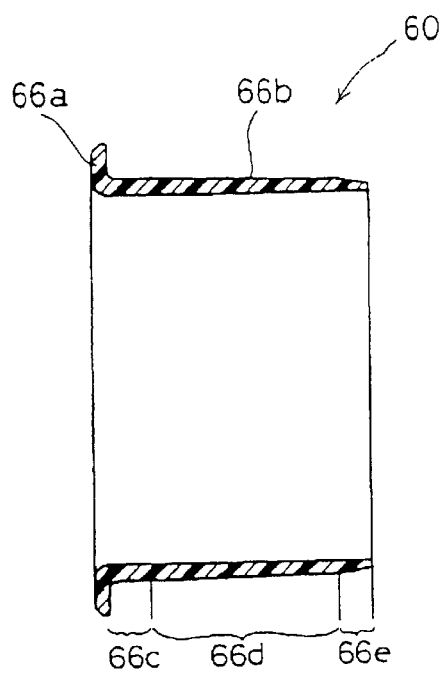
FIG. 9 is an enlarged cross sectional view of a spring guide according to an embodiment of the present invention.
Figure 10:
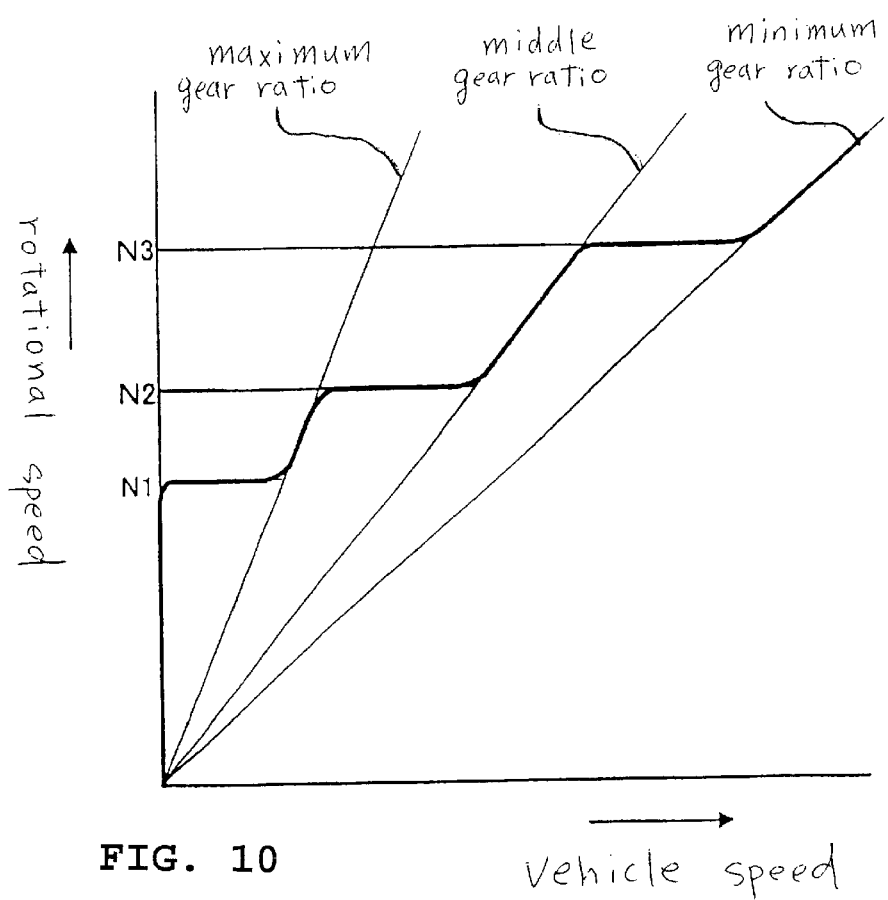
FIG. 10 is a graphical view of the operational characteristics of a V-belt-type automatic transmission.

Hereinafter, the present invention will be described in detail with reference to the accompanying drawings. FIG. 1 is a left side elevational view of a rear portion of a motorcycle mounted with a V-belt-type automatic transmission according to an embodiment of the present invention. FIG. 2 is a cross sectional view taken along line II—II in FIG. 1. FIG. 3 is a cross sectional view taken along arrows III in FIG. 2 with a cover of a transmission case removed according to an embodiment of the present invention. FIG. 4 is rear side view of a drive side moveable pulley piece according to an embodiment of the present invention. FIG. 5 is a cross sectional view taken along line V—V in FIG. 4. FIG. 6 is a cross sectional view taken along line VI—VI in FIG. 4. FIG. 7 is an enlarged cross sectional view of a portion of FIG. 5. FIG. 8 is an enlarged cross sectional view of a driven pulley according to an embodiment of the present invention. FIG. 9 is an enlarged cross sectional view of a spring guide according to an embodiment of the present invention. FIG. 10 is a graphical view of the operational characteristics of a V-belt-type automatic transmission.

FIG. 1 is a left side elevational view of a rear portion of a scooter-type motorcycle 1 mounted with a V-belt-type automatic transmission according to an embodiment of the present invention. A power unit 3 arranged below a vehicle frame 2 includes an internal combustion engine 4 and a transmission 6 (refer to FIG. 3) transmitting power from the internal combustion engine 4 to a rear wheel 5. The transmission 6 is stored in a transmission case 7.

A hangar bracket (not shown in the drawing) is provided in a protruding condition above the crankcase 11 (refer to FIG. 2). A hangar bracket 9 is provided above the internal combustion engine 4 provided in a protruding condition above and in front of transmission case 7 of the power unit 3. Both the transmission case 7 and internal combustion engine 4 are mounted so as to be able to swing about a pivot shaft 8 held by a pair of left and right brackets provided above a sloping part extending above and diagonally to the rear part of vehicle frame 2. As the rear part of the power unit 3 is supported by the vehicle frame 2 via a shock absorber 10, the power unit 3 can move back and forth in a vertical direction toward the vehicle frame 2 with the pivot shaft 8 set as its center.

As shown in FIG. 2 and FIG. 3, the transmission case 7 is made up of a left crankcase 11L and formed integrally with the case body 7a. A cover 7b is attached to the case body 7a on the left side. The transmission case 7 is also arranged on the left side of a motorcycle 1 while extending from the crankcase 11 of the internal combustion engine 4 in the vicinity of the rear axle 12. A cover 13 with a shroud is mounted on the cover 7b. A V-belt 67 is cooled by the air sucked in from the shroud and blown by the fan arranged on the rear surface of a drive-side fixed pulley piece that is an element of a drive pulley of an automatic transmission 35 which will be described hereinafter.

The internal combustion engine 4 is a single cylinder 4-cycle SOHC (single over-head camshaft) type water-cooled internal combustion engine. A piston cylinder 14 is arranged with its axial line oriented slightly diagonally above and in front of a longitudinal axis of the motorcycle 1. A cylinder 15 is laid on top of the piston cylinder 14 and connected by bolts. A crankshaft 19 rotatably supported by left side and right side crankcases 11L, 11R via respective ball bearings 17, 18 is connected to a piston 20 fitted into the piston cylinder 14 so as to slide in a reciprocating manner via a connecting rod 21. The crankshaft 19 is rotated and driven by reciprocation of the piston 20.

An intake port is connected to a carburetor 22 via an intake pipe and arranged on the cylinder head 15. An exhaust port is connected to an exhaust pipe arranged on the cylinder head 15. In a valve chamber made up of a cylinder head 15 and a cylinder head cover 16 connected to the cylinder head 15 with bolts, a cam shaft 23 is provided that is made up of an intake cam and an exhaust cam. The intake cam and exhaust cam each drive and operate the intake valve and exhaust valve via rocker arms, respectively, and are rotatably supported in the cylinder head 15.

An air suction pipe 24 that supplies air taken in from the air cleaner via a reed valve device as exhaust secondary air is connected to the exhaust port. An air amount control valve 25 which controls the amount of exhaust secondary air is provided in the air suction pipe 24, and reference numeral 26 is a spark plug mounted so as to project into the fuel chamber 27.

A cam drive sprocket 28 and a sprocket 29 for an oil pump and a water pump are spline-connected to a part of the crankshaft 19 and projecting to a right side of a ball bearing 18. The cam drive sprocket 28 is connected to and drives the cam driven sprocket 30 spline-connected to the cam shaft 23 via a timing chain 31 wound between the two sprockets 28 and 30. The camshaft 23 is rotated at ½ the rotational speed of the crankshaft 19. A pump drive sprocket 29 is connected to and drives a pump driven sprocket that is spline-connected to the pump shaft via a chain. A starter driven gear 33 connected to and driven by a starter motor 32, and an alternator 34, are provided at the right side of the right end part of the crankshaft 19.

The transmission 6 is provided with a V-belt-type automatic transmission 36, centrifugal-type starting clutch and final reduction gear 37. The drive pulley 38 of the V-belt-type automatic transmission 35 is arranged at the left end of the crankshaft 19 extending to the left side of a ball bearing 17.

The drive pulley 38 is provided with a drive side fixed pulley piece 39 spline-connected close to the left end of crankshaft 19 serving as a drive shaft, a drive side movable pulley piece 40 positioned to the right side of the drive side fixed pulley piece 39, a cam plate 41 fitted to crankshaft 19 and positioned to the right side of the movable pulley piece 40, and weight rollers 42 and 43 as a plurality of centrifugal weights arranged between the drive side movable pulley piece 40 and the cam plate 41.

The cam plate 41 is fixed in the axial direction of the crankshaft 19 with a sleeve 44 joined at the drive side fixed pulley piece 39 and outer periphery of crankshaft 19. Accordingly, the cam plate 41, drive side fixed pulley piece 39 and sleeve 44 rotate integrally with the crankshaft 19. The drive side movable pulley piece 40 is fitted into the outer periphery of a slide collar 45 slidably fitted into an outer periphery of the crankshaft 19 in an axial direction of the crankshaft 19. The drive side movable pulley piece 40 is fixed integrally with the slide collar 45 in an axial direction by a detent ring.

An engagement piece 46 fixed on the cam plate 41 is fitted to a projecting piece 40a formed on a rear surface of the drive side movable pulley piece 40 opposite to a contact surface of a V-belt 67. The engagement piece 46 is slidable in the axial direction and fixed in the rotating direction, which means that the drive side movable pulley piece 40 can move in the axial direction of the crankshaft 19 and also rotate together with cam plate 41.

As shown in FIG. 4 through FIG. 6, six pulley side guide surfaces 40b, 40c for guiding a plurality of weight rollers 42, 43 are formed extending in a radial direction of the crankshaft 19 on a rear surface of drive side movable pulley 40. The six pulley side guide surfaces 40b, 40c include curved or sloped surfaces sloping down to the cam plate 41 as the cam plate runs radially outwards relative to the plane surface which is at right angles to a rotating axis line L of the crankshaft 19. The pulley side guide surfaces 40b, 40c are formed in a peripheral direction of the drive side movable pulley piece 40 keeping a radial clearance.

A pair of ribs 40d, 40e are formed with a clearance slightly wider than the length of a weight roller 42, 43 in an axial direction and on both sides in a peripheral direction of each pulley side guide surface 40b, 40c. On a surface of the cam plate 41 at a drive side movable pulley piece 40 side, a cam side guide surface 41a is formed with a circular surface sloped down to the drive side movable pulley piece 40 as it runs radially outwards relative to the orthogonal plane surface. Each weight roller 42, 43 is stored movable in a radial direction of the crankshaft 19, and each weight roller 42, 43 comes into contact with both the pulley side guide surfaces 40b, 40c, and the cam side guide surface 41a in a groove A. The groove A is formed by the pulley side guide surfaces 40b, 40c and a pair of ribs 40d, 42e placed between each pulley side guide surface 40b, 40c and the cam side guide surface 41a.

The 6 pulley side guide surfaces 40b, 40c include 3 pairs of guide surfaces consisting of a first pulley side guide surface 40b and a second pulley side guide surface 40c having different shapes. On the rear surface of the drive side movable pulley piece 40, cylindrical section 40f having a cylindrical shape is arranged at the outer position in a radial direction of the pulley side guide surface 40b, 40c protruding towards the cam plate 41 side. A first stopper surface 40g and a second stopper surface 40h to prevent first and second weight rollers 42, 43 from moving completely outwards in a radial direction, respectively are provided inside the cylindrical section 40f, in correspondence with first and second pulley side guide surfaces 40b, 40c.

The second stopper surface 40h is positioned further inwards in the radial direction than the first stopper surface 40g. Accordingly, the length of the second pulley side guide surface 40c in the radial direction is shorter than the first pulley side guide surface 40b in the radial direction, but at a part further inwards than the position where the second stopper is arranged. The shape of each guide surface of the first and second pulley side guide surfaces 40b, 40c are similar. First and second pulley side guide surfaces 40b, 40c are arranged alternately in the peripheral direction, and 3 first pulley side guide surfaces 40b are provided at a uniform distance, and 3 second pulley side guide surfaces 40c are also provided at a uniform distance.

The six weight rollers 42, 43 with similar shapes include 2 types of weight rollers, namely three first weight rollers 42 and three second weight rollers 43 with the weight of the second weight rollers being lighter than the first weight rollers 42. The first weight rollers 42 are arranged to be guided by the first pulley side guide surface 40b, and the second weight rollers 43 are arranged to be guided by the second pulley side guide surface 40c.

FIG. 5 is a cross sectional view taken along line V—V in FIG. 4. In FIG. 5, first and second weight rollers 42, 43 are provided with cylindrical sections 42a, 43a with similar outer diameters and different inner diameters. The peripheral surfaces of the cylindrical sections 42a, 43a and ends of those close to the outer periphery are covered with a cover 42b, 43b made of synthetic resin. Therefore, the drive side movable pulley piece 40 and the cylindrical sections 42a, 43a, both made of metal, are prevented from coming into contact with each other, so that each weight roller 42, 43 can rotate smoothly.

Next, both stopper surfaces 40g, 40g will be described. The first stopper surface 40g includes a plate surface at approximately right angles to the orthogonal plane surface, and prevents the first weight roller 42 from moving in a radial direction in the high-speed rotation range where rotational speed is higher, thereby setting a minimum gear ratio. The second stopper surface 40h includes a sloped plane surface crossing the orthogonal plane surface forming an acute angle at an outer side in the radial direction, so that the distance from a rotating axis line L increases further to the end of the cylindrical section 40f along the axial direction of the crankshaft 19.

The angle θ prevents the second weight roller 43 from coming into contact with the second pulley side guide surface 40c in the high-speed rotation range after coming into contact with the second stopper surface 40h in a condition where the rotational speed of the internal combustion engine 4 reaches the designated minimum rotational speed in the middle-speed rotation range where the middle gear ratio is set.

Also, angle θ is set so as not to actually participate in transmission in the high-speed rotation range where the minimum gear ratio is set, i.e., to make a force component based on the centrifugal force of the second weight roller 43 applied by coming into contact with the second stopper surface 40h that moves the drive side movable pulley piece 40 in the axial direction as small as possible. Therefore, the first weight roller 42 does not govern the movement of drive side movable pulley piece 40 in the axial direction as a result of movement of the first weight roller 42 in the radial direction on the first pulley side guide surface 40b.

Since the second stopper surface 40h slopes(as seen in FIG. 7), the center of gravity of the second weight roller 43 C1 is positioned closer to the cam plate 41 by a designated distance d in the axial direction of the crankshaft 19 from the contact line C2 of the second weight roller 43 and second stopper surface 40h when the second weight roller 43 comes into contact with the second stopper surface 40h.

In FIG. 7, as centrifugal force F effects the second weight roller 43 and a moment M acts in a clockwise direction, the second weight roller 43 rolls and moves slightly in a radial direction and comes into contact with the cam plate 41. The second weight roller 43 then is pressed against the cam plate 41 by the moment M. The second weight roller 43 is also pressed against the cam plate 41 as a result of the force component Ft towards the cam plate 41 of the centrifugal force F caused by the second weight roller 43 coming into contact with second stopper surface 40h.

Accordingly, in a high speed rotation range, even when vibrations of the internal combustion engine 4 cause vibration of drive pulley 38 in the axial direction of the crankshaft 19, a space in the axial direction between the second pulley side guide surface 40c and the second weight roller 43 suppresses the relative movement of the drive side movable pulley piece 40, cam plate 41 and second weight roller 43 in the axial direction, so that the second weight roller 43 can be prevented from colliding with the second pulley side guide surface 40c and the cam plate 41.

Movement of the second weight roller 43 in the axial direction after coming into contact with the second stopper surface 40h is prevented, but there is a possibility of slight movement in the radial direction to such an extent as not to govern movement of the drive side movable pulley piece 40 in the axial direction.

As shown in FIG. 2, the driven pulley 48 of the automatic transmission 35 is attached at the left end of the driven shaft 47 arranged at a rear position of the case body 7a of the transmission case 7 and oriented in a widthwise direction of a motorcycle 1. As shown in FIG. 8, the driven pulley 48 includes a driven side fixed pulley piece 52 fixed integrally to an inner sleeve 51 rotatably supported on the driven shaft 47 by a pair of bearings 40 and 50. A driven side movable pulley piece 54 fixed integrally to an outer sleeve 53 is slidably fitted in the axial direction and rotating direction of driven shaft 47 to an outer periphery of the inner sleeve 51. A spring 55 is formed from a cylindrical pressed coil spring, urging the driven side movable pulley piece 54 against the driven side fixed pulley piece 52 by its spring force.

A cam groove 57 that enables relative movement of the driven side movable pulley piece 54 in the axial direction with respect to the driven side fixed pulley piece 52 is provided on an outer sleeve 53. The cam groove 57 consists of a sloped section that enables the driven side fixed pulley piece 52 and the driven side movable pulley piece 54 to move in a rotating direction and axial direction in the condition that the difference of the rotational speed between the driven side fixed pulley piece 52 and the driven side movable pulley piece 54 is larger than a predetermined value. Grease is filled in the cam groove 58 where the driven side fixed pulley piece 52 and the driven side movable pulley piece 54 can rotate integrally under normal conditions.

An oil seal 58 is mounted on the two ends of the inner periphery of outer sleeve 53 that contact and slide on the outer periphery of the inner sleeve 51. The cam groove 57 is also covered in an oil tight manner by a seal cover 60 having a cylindrical shape fitted into an outer periphery of outer sleeve 53 via an O-ring 59. A spring bearing section 60a that the right end of the spring 55 comes into contact with is arranged at the right end of the seal cover 60, and the spring bearing section 60a comes into contact with the driven side movable pulley piece 54.

With respect to the driven shaft 47, a centrifugal starting clutch 36 is provided at the left end positioned further to the left than the driven side movable pulley piece 54. The centrifugal starting clutch 36 includes a clutch outer 61 spline-connected to the driven shaft 47, fixed in an axial direction, and rotating integrally with the driven shaft 47. The starting clutch 36 also includes a drive plate 62 fixed to and rotating integrally with the inner sleeve 51 at an inner side of the clutch outer 61.

In a condition where the inner sleeve 51 rotates faster than a prescribed first rotational speed n1 mentioned later, a clutch shoe 63 swingably supported by a drive plate 62 swings and moves to an outer side in the radial direction by centrifugal force against the spring force of the clutch spring 64. Then frictional member 65 provided on an outer periphery of the clutch shoe 63 comes into contact with the inner peripheral surface of the clutch outer 61, and the starter clutch 36 becomes connected.

A spring 55 is guided by a spring guide 66 made of self-lubricating synthetic resin such as nylon and is arranged at an inner side so as to keep its cylindrical shape during expansion and compression. Therefore, the linearity of the spring force is secured. A spring guide 66 includes a flange section 66a having a spring junction that the left end of the spring 55 comes into contact with, and a cylindrical section 66b arranged inside the spring 55 and extending in an axial direction of the spring 55. The spring guide 66 is supported by the flange section 66a fitted into an inner periphery of an indented section provided on the drive plate 62, and an inner periphery of the cylindrical section 66b fitted into the seal cover 60.

As shown in FIG. 9, a cylindrical section 66b of the spring guide 66 with a similar inside diameter along its axial line includes a similar diameter member 66c with a similar outside diameter. The cylindrical section 66b includes a first tapered section 66d having a tapered shape with a diameter decreasing at the end, and a second tapered section 66e with a diameter decreasing at the end and sloping more than the first tapered section 66d, in the order starting from the flange section 66a to the opposite end along the axial line.

Lengths of the similar diameter section 66c, first tapered section 66d, and second tapered section 66e in the axial direction are set at a suitable length corresponding to the spring 55. The length of the similar diameter section 66c, which comes into contact with an inner periphery of the spring 55, is the thickest and has high rigidity. The similar diameter section 66c is set at a length capable of supporting the spring 55 in a stable condition while suppressing deflection of the spring 55 in a radial direction caused by vibrations. At the first tapered section 66d a slight space is formed between the inner periphery of the spring 55 to protect against frictional forces caused by coming into contact with the spring 55 and enable smooth expansion of the spring 55. This arrangement also prevents the spring 55 from collapsing or bending by making the slope of the taper gradual.

The second tapered section 66e with a steep slope adjacent to the end forms a relatively large space between the inner periphery of the spring 55, so that a spiral wire rod forming the spring 55 does not get caught on the end of spring guide 66 when the spring 55 is compressed. A seal cover 60 fitted into an inner periphery of the spring guide 66 is positioned on an inner periphery of the first tapered section 66d and the second tapered section 66e in the state where the driven side movable pulley piece 54 is in the very vicinity of the driven side fixed pulley piece 52.

With the drive pulley 38 and driven pulley 48 formed as described as above, each fixed pulley piece 39, 52 and movable pulley piece 40, 54 sandwich the V-belt 67 wound around both pulleys 38, 48 between the contact surface of the V-belt 67 arranged at their opposite sides in a cone shape.

Referring to FIG. 2 and FIG. 3, the driven shaft 47 drives and is linked to a rear shaft 12 by the series of gears forming the final reduction gear 37. A large gear 69 with a large diameter and small gear 70 with a small diameter are provided on the middle shaft 68. The gear 71 with a small diameter on the driven shaft 47 meshes with the large gear 69 on the middle shaft 68, and the small gear 70 on the middle shaft 68 meshes with a large gear 72 on the rear shaft 12. The rotation of the driven shaft 47 is reduced in two steps and transmitted to the rear shaft 12 by the final reduction gear 37 as described above.

Next, a transmitting operation of this automatic transmission 35 will be described referring to FIGS. 5, 8, and 10. When the internal combustion engine 4 is operated and the rotational speed of the crankshaft 19 is less than a first rotational speed N1, the starting clutch 36 is disengaged and the driven shaft 48 is stopped, i.e. the motorcycle 1 is in a stationary state. Here at the driven pulley 38, the drive side movable pulley piece 40 is at the furthest point in a radial direction of crankshaft 19 from the drive side fixed pulley piece 40 due to the tension of the V-belt 67. The wrapping radius of V-belt 67 is smallest when the driven side movable pulley piece 54 is urged towards the driven side fixed pulley piece 52 and becomes closest to it. Accordingly, the wrapping radius of the V-belt 67 is at its largest, and the rotational power of crankshaft 19 is transmitted to driven pulley 48 at the largest gear ratio.

When rotational speed is greater than the first rotational speed N1, the clutch shoe 63 is reciprocated by centrifugal force and comes into contact with the clutch outer 61. The starting clutch 36 starts to get connected, the driven shaft 47 begins to rotate, and the motorcycle starts moving. The starting clutch 36 is put into a completely connected state, and the rotational power of the crankshaft 19 is transmitted to the driven pulley 47 at the largest gear ratio.

With an increase in rotational speed, centrifugal force of the first weight roller 42 and second weight roller 43 of the drive pulley 38 becomes increased. However, while the centrifugal force is not greater, i.e. rotational speed is not greater than a second rotational speed N2, the component of force to move the drive side movable pulley piece 40, 39 in an axial direction towards the drive side fixed pulley piece is not greater than the tension of the V-belt 67 that moves the drive side movable pulley piece 40 out from the drive side fixed pulley piece 39.

Therefore the first weight roller 42 and the second weight roller 43 stay at the default position between the corresponding first and second pulley side guide surfaces 40b, 40c and the cam side guide surface 41a (position Q1, R1 shown in FIG. 5). There the wrapping radius of the V-belt 67 at the drive pulley 38 becomes a minimum (position P1 shown in FIG. 5), and the wrapping radius of the V-belt 67 at the driven pulley 48 becomes a maximum (position P1 shown in FIG. 8) value, and the gear ratio is kept at the maximum. The maximum gear ratio is kept in the low-speed rotating range where the rotational speed increases up to the second rotational speed N2. At this gear ratio, the rotational power of the crankshaft 19 is transmitted to the driven shaft 47, and the speed of the vehicle changes in proportion to the rotational speed of the crankshaft.

When rotational speed becomes greater than the second rotational speed N2, the component of force of centrifugal force of the first and second weight roller 42 and 43 that moves the drive side movable pulley piece 40 towards the drive side fixed pulley piece 39 in an axial direction becomes larger than the tension of V-belt 67. There, at the drive pulley 38, first and second weight rollers 42 and 43 are guided by corresponding first and second pulley side guide surfaces 40b and 40c and the cam side guide surface 41a, and rotate and move in a radial direction.

The drive side movable pulley piece 40 moves in an axial direction and approaches the drive side fixed pulley piece 39, and the wrapping radius of V-belt 67 becomes larger. At the driven pulley 48, against the spring force of the spring 55, the driven side movable pulley piece 54 moves in an axial direction and moves apart from the driven side fixed pulley piece 52 while compressing the spring 55. The wrapping radius of the V-belt 67 becomes smaller and the speed is automatically changed.

When the rotational speed reaches the minimum prescribed rotational speed where the middle gear ratio will be set, the second weight roller 43 comes into contact with the second stopper surface 40h and its movement in the radial direction is actually prevented (position R2 shown in FIG. 5). The component of force of the centrifugal force of first weight roller 42 that moves the drive side movable pulley piece 40 in an axial direction is not greater than the tension of the V-belt 67 which moves the drive side movable pulley piece 40 out from the drive side fixed pulley piece 39.

Therefore, the drive side movable pulley piece 40 and first weight roller 42 stay in the current position (position Q2 shown in FIG. 5). Here, the wrapping radius of the V-belt 67 around the drive pulley 38 becomes larger (position P2 shown in FIG. 5), the wrapping radius of V-belt 67 around the driven pulley 48 becomes smaller (position P2 shown in FIG. 8), and the middle gear ratio, which is smaller than the maximum gear ratio, is set. Also, in the middle-speed rotation range where rotational speed increases up to a third rotational speed N3, the middle gear ratio is maintained. Under this middle gear ratio, the rotational power of crankshaft 19 is transmitted to the driven shaft 47, and the speed of the vehicle changes corresponding to the rotational speed.

When the rotational speed increases and exceeds the third rotational speed N3, a component of force of the centrifugal force of the first weight roller 42, that moves drive side movable pulley piece 40 towards the drive side fixed pulley piece 39, becomes larger than the tension of the V-belt 67. At drive pulley 38, first weight roller 42 is guided by corresponding first pulley side guide surface 40b and cam side guide surface 41, and rolls and moves in the radial direction. Accordingly, the drive side movable pulley piece 40 moves in an axial direction and approaches the drive side fixed pulley piece 39, and the wrapping radius of V-belt 67 becomes larger.

At the driven pulley 48, the driven side movable pulley piece 54 moves in an axial direction against the spring force of the spring 55 while compressing the spring 55, and as the wrapping radius of V-belt 67 becomes smaller, transmission can be automatically operated.

At this time, the second weight roller 43 is not involved in the movement of the drive side movable pulley piece 40 in the axial direction and rolls slightly over the sloped second stopper surface 40h in radial direction, and is pressed onto the cam plate 41 by the force effected by a moment M based on the centrifugal force and a component of force Ft of the centrifugal force in the direction toward the cam plate.

When first weight roller 42 comes into contact with the first stopper surface 40g and is prevented from moving in the radial direction (position Q3 shown in FIG. 5), the drive side movable pulley piece 40 stays at the position and the wrapping radius of the V-belt around the drive pulley 38 becomes a maximum (position P3 shown in FIG. 5) and the wrapping radius of the V-belt 67 around the driven pulley 48 becomes a minimum (position P3 shown in FIG. 8), and a minimum gear ratio smaller than the middle gear ratio is set.

The second weight roller 43 is pressed onto the cam plate 41 after moving slightly in a radial direction (position P3 shown in FIG. 5). In the following high-speed rotation range, the minimum gear ratio is maintained, and with this gear ratio, the rotational force of crankshaft 19 is transmitted to the driven shaft 47, and the vehicle speed changes corresponding to the rotational speed.

The following is a description of the operational effects of the embodiment with the configuration described above.

In the high rotation range of the internal combustion engine in the state where the second weight roller 43 comes into contact with second stopper and is actually prevented from moving in the radial direction, when a space is formed between the second weight roller 43 and the second pulley side guide surface excessive vibration may develop. Vibrations of the internal combustion engine, etc., for example, a vibration of the crankshaft 19 in an axial direction caused by the combustion and burst energy around the top dead center of the piston 20 of the internal combustion engine 4, is transmitted to the drive pulley 38 and cause relative movement between the drive side movable pulley piece 40, the cam plate 41 and the second weight roller 43 in an axial direction of the crankshaft 19 and the second weight roller 43 may collide with the second pulley side guide surface 40c of the drive side movable pulley piece 40 and cam side guide surface 41a.

However, since the weight of the second weight roller 43 is lighter than the weight of the first weight roller 42, the energy of collision is small. Therefore, wear of the second pulley side guide surface 40c, cam side guide surface 41a, and second weight roller 43 can be reduced according to the arrangement of the present invention. Further, as the energy of collision is small, noise due to collision(s) is smaller and operating noise can be reduced.

As a result, wear of the second pulley side guide surface 40c, cam side guide surface 41a and second weight roller 43 will also be reduced. The second weight roller 43 can move in a radial direction smoothly, therefore transmission can be performed smoothly. As wear is reduced, set transmission characteristics can be kept over the long term and noise due to the collision of the second weight roller 43 can be reduced.

Furthermore, in the high-speed rotation range, as the weight of the second weight roller 43 is lighter than the first weight roller 42, occurrence of wear and noise due to the collision of the second weight roller 43 against the second pulley side guide surface 40c and the cam side guide surface 41a are reduced. Additionally, when vibrations of the internal combustion engine 4, etc. are transmitted to the drive pulley 38 and a force is induced causing the relative movement between the drive side movable pulley piece 40, the cam plate 41 and the centrifugal weight in an axial direction of the crankshaft 19. However, relative movement of the second weight roller 43 in an axial direction of the crankshaft 19 can be suppressed because the second weight 43 roller is pressed onto the cam plate 41 by a pressing force generated as a result of coming into contact with the sloped second stopper surface 40h, i.e., a force effected by moment M due to centrifugal force generated at the second weight roller and a component of force Ft in a direction towards cam plate 41 (see FIG. 7).

Therefore collisions of the second weight roller 43 against the second pulley side guide surface 40c and cam side guide surface 41a can be reduced, and the occurrence of wear of second pulley side guide surface 40c, cam side guide surface 41a and second weight roller 43 due to collisions can be suppressed. Accordingly, the occurrence of noise due to collisions can also be suppressed.

Similarly, as the occurrence of collisions of second weight roller 43 can be suppressed, wear of the second pulley side guide surface 40c, cam side guide surface 41a and second weight roller 43 can be further reduced. Therefore, the second weight roller 43 can move in a radial direction smoothly enabling smooth transmission. Also, as wear of the parts is reduced, set transmission characteristics can be maintained over the long term. Furthermore, noise due to the collisions of the second weight roller 43 can be further reduced.

A space, which becomes wider at the end, is formed between the outer periphery of the second tapered section 66e of the tapered section 66b of the cylindrical spring guide arranged inside the spring 55. The spring includes a cylindrical coil spring of the driven pulley 48 and the inner periphery of spring guide 55.

Therefore, when changing speed, the driven side movable pulley piece 54 moves in an axial direction as the driven side movable pulley piece 54 is moved in the axial direction by the centrifugal force acting on the first and second weight rollers 42 and 43 and the spring 55 is compressed. The wire rod wound in a spiral will not be caught by coming into contact with the end of the spring guide.

As a result, the driven side movable pulley piece 54 can move in an axial direction smoothly, enabling smooth transmission. As only the end of the spring guide has a tapered shape, the spring can be prevented from collapsing or bending due to parts of the spring guide 66 other than its end, and therefore the function of the spring guide will not be lost. In particular, at the first tapered section 66 with a more gentle slope compared the tapered section 66e, a slight space is formed between the first tapered section and the inner periphery of the spring 55 so that the spring 55 will not be prevented from smooth expansion and compression by frictional force generated by coming into contact with the spring 55, and prevented from collapsing and bending by making the taper slope gentle.

Additionally, in the state where the driven side movable pulley piece 54 is in the very vicinity of the driven side fixed pulley piece 52, the seal cover 60 meshed with the inner periphery of the spring guide 66 is positioned in the inner periphery of the first tapered section 66d and second tapered section 66e. Despite the fact that the spring guide 66 is thinned by the taper, its rigidity is strengthened by the rigidity of seal cover 60. Both the tapered sections 66d and 66e merely get displaced by vibrations, and therefore the spring guide 66 can function efficiently.

The spring guide 66 is made of a self-lubricating synthetic resin. Frictional force against the spring 55 is kept small by the self-lubrication of the spring guide 66 in the case where the spring 55 comes into contact with and slides on spring guide 66. Therefore the spring 55 can be expanded and compressed smoothly, enabling smooth transmission.

Following is a description of the embodiment with a modified configuration of the embodiment mentioned above.

In the preceding embodiment, the weight of second weight roller 43 is lighter than the first weight roller 42, and the second stopper surface 40h is sloped so that a pressing force to press the second weight roller 46 onto cam plate 41 will be generated by contact of the second weight roller 43 against the second stopper surface 40h. Weight of the second weight roller 43 may also be made lighter than the first weight roller 42, and the second stopper surface 40h may be provided as a plane surface that goes radially outwards against the orthogonal plane surface as well as the first stopper surface 40g.

The weight of the second weight roller 43 may also be equal to that of the first weight roller 42, and the second stopper surface 40h may be sloped so that a pressing force to press the second weight roller 46 onto the cam plate 41 will be generated by the contact of the second weight roller 43 against the second stopper surface 40. In any case, as wear of the second pulley side guide surface 40c, cam side guide surface 41a and second weight roller 43 due to collisions of the second weight roller 43 are suppressed, the second weight roller 43 can move in a radial direction smoothly, thus enabling smooth transmission.

Also, due to the suppression of the wear of these elements, set transmission characteristics can be maintained over the long term, and furthermore, noise due to collisions of the second weight roller 43 can be suppressed.

In the embodiment described above, a plurality of guide surfaces arranged with clearance in the peripheral direction to guide the movement of the first and second weight rollers 42 and 43 in the radial direction are provided as first and second pulley side guide surfaces 40b, and 40c on the drive side movable pulley piece 40. However, a guide surface corresponding to these first and second pulley side guide surfaces 40b and 40c can be provided on the cam plate 41, i.e. the guide surface having a circular surface that can be provided on a rear surface of the drive side movable pulley piece 40.

In this case, the first and second stopper surfaces 40g and 40h can be provided on the cam plate 41 as well. The second stopper surface 40h arranged as a plane surface can be arranged as a circular surface with a similar slope. In the embodiment described above, there are two types for each of the guide surfaces 40b and 40c having different shapes, and weight rollers 42 and 43 with different weights.

Those guide surfaces and weight rollers can be provided with three types for each, and in this case, more than two middle gear ratios can be set. Additionally, the number of the plurality of guide surfaces arranged with clearance in a peripheral direction are not limited to six and can set at appropriate numbers. For example, when there are three types of guide surfaces, nine guide surfaces can be provided. Also, it is possible to have a drive source other than an internal combustion engine 4 as the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A V-belt automatic transmission for a vehicle comprising:
   a drive pulley provided on a driveshaft, the drive pulley further including
   a drive side moveable pulley piece,
   a drive side fixed pulley piece,
   a cam plate,
   a plurality of centrifugal weights arranged between the drive side movable pulley piece and the cam plate, said drive side movable pulley piece moveable in an axial direction of the driveshaft and rotateable with the cam plate on said drive shaft, and
   a plurality of pulley side guide surfaces for guiding the plurality of centrifugal weights formed extending in a radial direction of the driveshaft on a rear surface of the drive side movable pulley, the plurality of centrifugal weights including a first set of centrifugal weights and a second set of centrifugal weights, each centrifugal weight of said first set is lighter than each centrifugal weight of said second set and said first and second set of centrifugal weights are rollers being provided with cylindrical sections, said cylindrical sections of said first weight rollers having
   outer diameters substantially equal to outer diameters of said second weight rollers,
   inner diameters different than inner diameters of said second weight rollers, and
   peripheral surfaces and ends of the cylindrical sections close to an outer periphery of said pulley guide surfaces being covered with a cover of synthetic resin;

a driven pulley provided on a driven shaft;
a V-belt having a wrapping radius and wrapped around said drive pulley and said driven pulley for transmitting torque from said drive shaft to said driven shaft, wherein the wrapping radius is changed based on a movement in a radial direction along each pulley side guide surface of the plurality of centrifugal weights arranged between a pulley side guide surface provided on the drive side movable pulley piece and a cam side guide surface provided on the cam plate;
a maximum gear ratio in a low-speed rotation range;
a middle gear ratio in a middle-speed rotation range;
a minimum gear ratio in a high-speed rotation range;
wherein the plurality of centrifugal weights are prevented from moving in a radial direction at a speed faster than a prescribed rotational speed in at least the middle-speed rotation range to thereby set and define the middle gear ratio;
a first stopper surface preventing the first set of lighter centrifugal weights from moving beyond a predetermined radius in a radial direction at a speed faster than the prescribed rotational speed in the high speed rotation range; and
a second stopper surface having a sloped planar surface forming an acute angle with respect to an orthogonal planar surface parallel to a rotating axis of the driveshaft, wherein the acute angle prevents said second set of weight rollers from contacting at least one of said pulley guide surfaces in the high-speed rotation range.

2. The V-belt automatic transmission according to claim 1, wherein a pressing force pushing the plurality of centrifugal weights against the cam plate is generated by the sloped surface of said second stopper surface, said pressing force created from contact of the plurality of centrifugal weights against the second stopper surface.

3. The V-belt automatic transmission according to claim 2, wherein the wrapping radius of the V-belt around the drive pulley and the driven pulley is changed by moving the drive side movable pulley piece against a spring force created in response to the movable pulley piece being moved by centrifugal force of the centrifugal weights.

4. The V-belt automatic transmission according to claim 3, wherein the spring force is created from a cylindrical coil spring, said cylindrical coil spring having an outer peripheral surface of a tip of a cylindrical spring guide arranged inside the cylindrical coil spring.

5. The V-belt automatic transmission according to claim 4, wherein the cylindrical spring guide has a tapered shape, said tapered shape having an outer diameter becoming smaller towards an opposite end.

6. The V-belt automatic transmission according to claim 4, wherein said spring guide is made of a synthetic resin having self-lubricating characteristics.

7. The V-belt automatic transmission according to claim 2, wherein the drive side moveable pulley further comprises
a plurality of pairs of ribs formed with a clearance slightly wider than a length of a centrifugal weight in an axial direction and extending in a peripheral direction of each pulley side guide surface; and
a cam side guide surface formed on a surface of the cam guide with a circular surface sloped toward the drive side movable pulley piece.

8. The V-belt automatic transmission according to claim 1, wherein each of said plurality of centrifugal weights is a cylindrical-shaped weight roller.

9. The V-belt automatic transmission according to claim 7, wherein each of said plurality of centrifugal weights is a cylindrical-shaped weight roller.

10. The V-belt automatic transmission according to claim 9, wherein each weight roller is moveably positioned in a radial direction of the driveshaft, and each weight roller contacts both the pulley side guide surfaces and the cam side guide surface in a groove formed between each pair of ribs and said pulley guide surface.

11. The V-belt automatic transmission according to claim 4, wherein said spring guide includes a flange section having a spring junction and a cylindrical section arranged inside the spring and extending in an axial direction of the spring.

12. The V-belt automatic transmission according to claim 11, wherein said cylindrical section includes a first tapered section having a tapered shape with a diameter decreasing at a first end, and a second tapered section with a diameter decreasing at a second end.

13. The V-belt automatic transmission according to claim 12, wherein said driven shaft is engaged with a centrifugal starting clutch, said centrifugal starting clutch including an outer clutch spline-connected to the driven shaft, fixed in an axial direction, and rotatably connected with the driven shaft.

14. The V-belt automatic transmission according to claim 13, wherein the starting clutch further includes a drive plate fixed to and rotating integrally with an inner sleeve at an inner side of the outer clutch.

15. The V-belt automatic transmission according to claim 13, wherein the driven shaft drives and is linked to a rear shaft by a series of reduction gears.

16. A V-belt automatic transmission for a vehicle comprising:
a drive pulley provided on a driveshaft, the drive pulley further including
a drive side moveable pulley piece,
a drive side fixed pulley piece,
a cam plate,
a plurality of centrifugal weights arranged between the drive side movable pulley piece and the cam plate, said drive side movable pulley piece moveable in an axial direction of the driveshaft and rotateable with the cam plate on said driveshaft, and
a plurality of pulley side guide surfaces for guiding the plurality of centrifugal weights formed extending in a radial direction of the driveshaft on a rear surface of the drive side movable pulley, the plurality of centrifugal weights including a first set of centrifugal weights and a second set of centrifugal weights, each centrifugal weight of said first set is lighter than each centrifugal weight of said second set and said first and second set of centrifugal weights are rollers being provided with cylindrical sections, said cylindrical sections of said first weight rollers having
outer diameters substantially equal to outer diameters of said second weight rollers,
inner diameters different than inner diameters of said second weight rollers, and
peripheral surfaces and ends of the cylindrical sections close to an outer periphery of said pulley guide surfaces being covered with a cover of synthetic resin;
a driven pulley provided on a driven shaft;
a V-belt having a wrapping radius and wrapped around said drive pulley and said driven pulley for transmitting torque from said drive shaft to said driven shaft, wherein the wrapping radius is changed based on a combination of a first movement in a radial direction along each pulley side guide surface of the plurality of centrifugal weights arranged between a pulley side guide surface provided on the drive side movable pulley piece and a cam side guide surface provided on the cam plate and second movement of the drive side movable pulley piece against a spring force created in response to the movable pulley piece being moved by centrifugal force of the centrifugal weights;

a maximum gear ratio in a low-speed rotation range;

a middle gear ratio in a middle-speed rotation range;

a minimum gear ratio in a high-speed rotation range;

wherein the plurality of centrifugal weights are prevented from moving in a radial direction at a speed faster than a prescribed rotational speed in at least the middle-speed rotation range to thereby set and define the middle gear ratio;

a first stopper surface preventing the first set of lighter centrifugal weights from moving beyond a predetermined radius in a radial direction at a speed faster than the prescribed rotational speed in the high speed rotation range; and a second stopper surface having a sloped planar surface forming an acute angle with respect to an orthogonal planar surface parallel to a rotating axis of the driveshaft, wherein the acute angle prevents said second set of weight rollers from contacting at least one of said pulley guide surfaces in the high-speed rotation range.

17. The V-belt automatic transmission according to claim 16, wherein the spring force is created from a cylindrical coil spring, said cylindrical coil spring having an outer peripheral surface of a tip of a cylindrical spring guide arranged inside the cylindrical coil spring.

* * * * *